Figure 1:
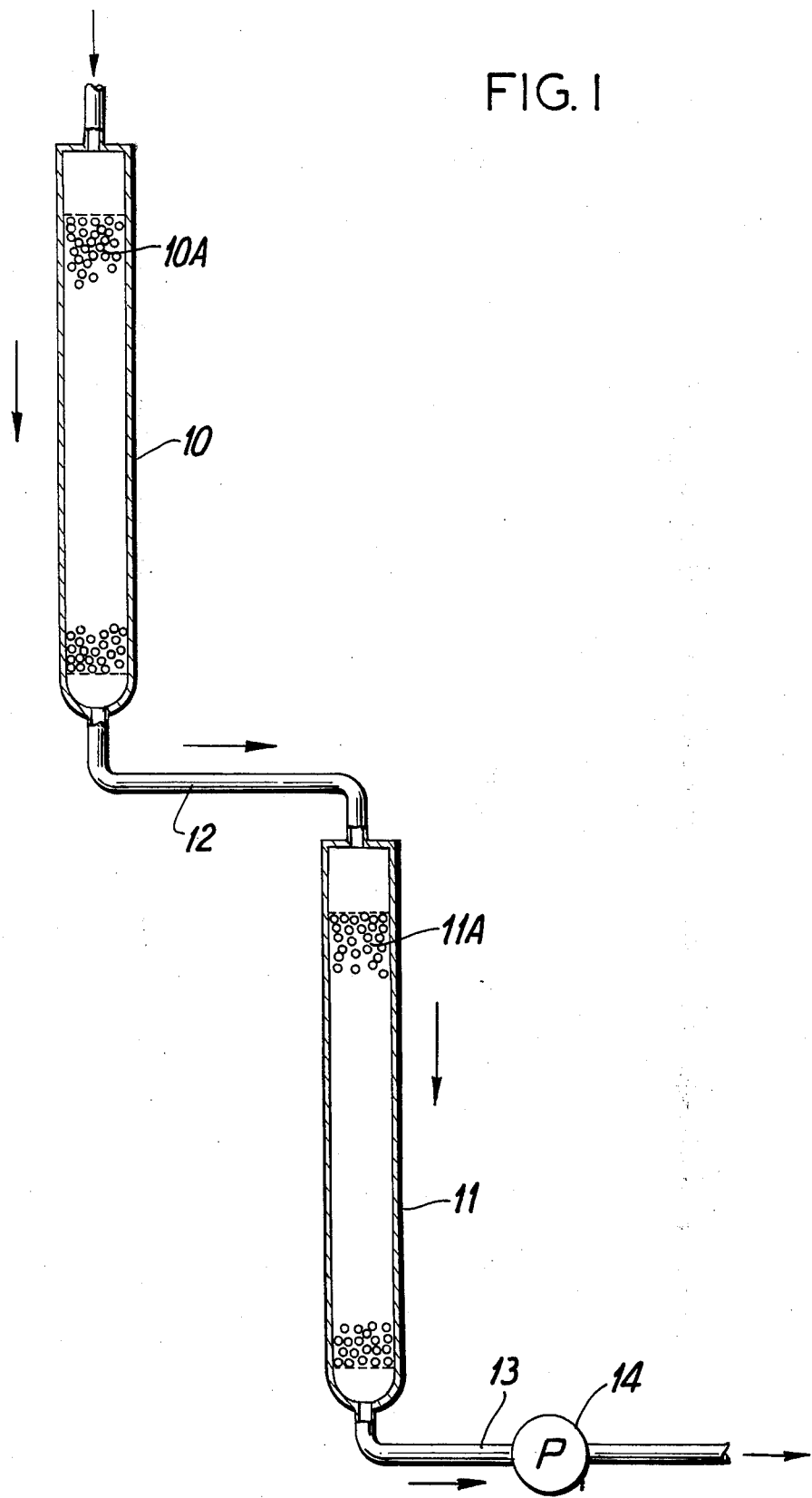

United States Patent [19]
Koehler et al.

[11] 3,914,374
[45] Oct. 21, 1975

[54] REMOVAL OF RESIDUAL COPPER FROM NICKEL SOLUTIONS

[75] Inventors: Harold Koehler; Weldon P. Zundel, both of Golden; Robert S. Rickard, Lakewood, all of Colo.

[73] Assignee: AMAX Inc., New York, N.Y.

[22] Filed: Feb. 8, 1974

[21] Appl. No.: 440,688

[52] U.S. Cl. .................................. 423/25; 423/544
[51] Int. Cl.² ........................ C01G 3/10; C01G 3/14
[58] Field of Search ........ 423/25, 544, 138; 210/38, 210/39; 75/108; 204/112

[56] References Cited
UNITED STATES PATENTS
2,614,029  10/1932  Moede ................................. 423/25

FOREIGN PATENTS OR APPLICATIONS
673,921  1/1930  France ................................. 423/25

Primary Examiner—Oscar R. Vertiz
Assistant Examiner—Brian E. Hearn
Attorney, Agent, or Firm—Kasper T. Serijan; Eugene J. Kalil

[57] ABSTRACT

Residual copper is removed from acid nickel solutions by contacting said solution with activated particulate carbon which adsorbs the copper. The copper is subsequently stripped from the activated carbon by either a sulfuric acid leach (e.g. 2% $H_2SO_4$) or by an ammonium hydroxide leach (e.g. 25% $NH_4OH$).

5 Claims, 2 Drawing Figures 3,914,374

REMOVAL OF RESIDUAL COPPER FROM NICKEL SOLUTIONS

This invention relates to a method for removing residual copper from acid solutions and, in particular, residual copper from nickel sulfate acid solutions.

BACKGROUND OF THE INVENTION

It is known to leach nickel-copper sulfide concentrates containing small amounts of cobalt for the recovery of nickel, copper and cobalt therefrom, among other metals that may be present, such as the precious metals. One method is to roast the sulfide concentrate to remove the sulfur and then leach the roasted concentrate with, for example, sulfuric acid to dissolve out the metal values.

A method which has been proposed is to selectively leach the nickel from a sulfide matte without a preroast treatment. A typical matte for that purpose is one containing about 50.5% Ni, 28.1% Cu, 0.6% Co, 2% Fe and 18.8% S, the amount of sulfur present being generally less than the stoichiometric amount required to combine with the metal values present, particularly nickel and copper.

The foregoing leach is carried out at atmospheric pressure under oxidizing conditions by using sulfuric acid as the leaching solution at temperatures ranging from about 160°F up to 180°F and higher. The starting pH is generally less than 1 and rises to between 5 and 6.8 pH upon completion of the selective leaching step. Any copper which dissolves is cemented out by free nickel present in the matte, such that the pregnant liquor which is rich in nickel contains residual copper in amounts ranging anywhere from about 3 to 250 ppm which should be removed to assure a final nickel product of the desired purity.

A conventional method employed to remove residual copper from solution is to precipitate out the copper as copper sulfide using $H_2S$ as the reagent. A disadvantage of this method is that $H_2S$ is a poisonous and a hazardous reagent and, therefore, must be handled carefully. In addition, precipitated copper sulfide is difficult to filter. A further disadvantage is its post-precipitation reaction which results in the formation of a fine colloidal precipitate continuously over a period of time.

It would be desirable to provide a simple method for removing residual copper from solution without any of the disadvantages of the $H_2S$ method.

OBJECTS OF THE INVENTION

It is thus the object of the invention to provide a method for removing residual copper from acid solutions.

Another object is to provide a method for removing residual copper from nickel sulfate leach solutions such that a fairly high purity nickel product can be produced substantially free of copper.

Figure 2:
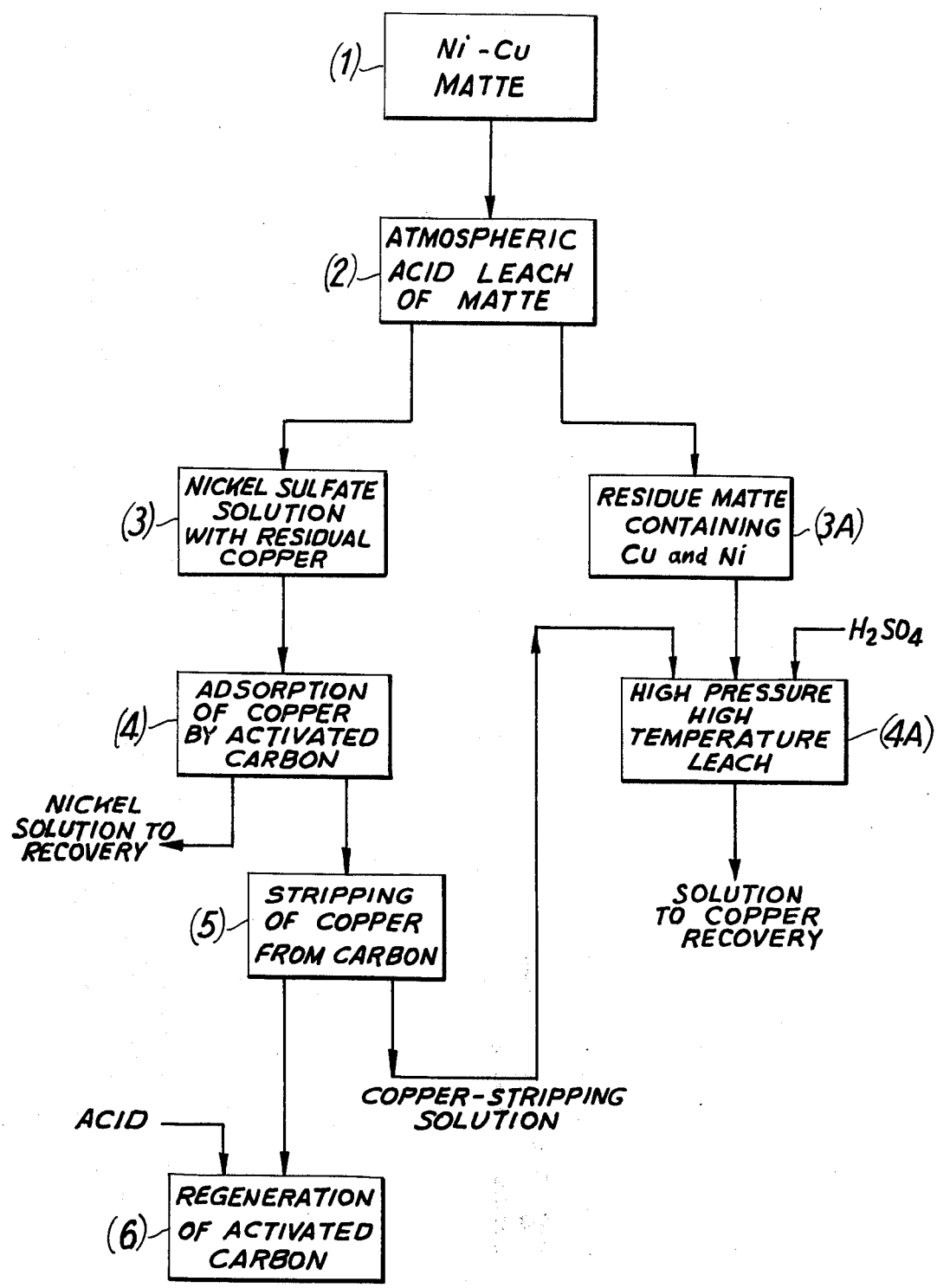

These and other objects will more clearly appear from the following disclosure and the accompanying drawing, wherein:

FIG. 1 is a schematic of a pair of series-connected adsorption towers or columns containing a loading of activated carbon; and FIG. 2 is a flow sheet illustrating a leaching system in which the process of the invention is employed.

STATEMENT OF THE INVENTION

Stating it broadly, a method is provided for removing residual copper from acid solutions of pH ranging from about 5 to 6.8 and containing copper ranging from about 3 to 250 ppm, the method comprising contacting the solution with activated particulate carbon in an amount sufficient to remove substantially said copper from said solution.

The method is particularly applicable to the treatment of nickel sulfate leach solutions containing said residual copper as well as small amounts of cobalt.

In a preferred embodiment, a nickel-cobalt sulfate solution having a pH of about 6.5 and containing residual copper, e.g. 20 to 30 ppm, is treated by passing it downwardly through a column of activated carbon at a flow rate of about 1.5 gallons/minute/foot$^2$ to provide an effluent containing less than about 1 ppm of copper. No significant amounts of nickel and cobalt are adsorbed and, moreover, the pH is relatively unaffected. An advantage of the invention is that the copper can be stripped from the carbon. Another advantage is that the activated carbon can be regenerated and used over again. An example of an activated carbon material found particularly useful is one designated as Pittsburgh activated carbon (type SGL, 8×30 mesh).

DETAILS OF THE INVENTION

In a specific embodiment of the invention, and with reference to the drawing, a solution containing 60 gpl Ni, 0.54 gpl Co, 25 ppm Cu and a pH of about 6.5 was treated in a pair of series-connected columns or towers 10 and 11 comprising 6 foot glass tubes of about 1 inch inside diameter with a bed of activated carbon in each (10A and 11A) of about 5 feet deep. In this embodiment, an equivalent of about 52.8 gallons of solution were processed per cubic foot of carbon at a flow rate of about 1.5 gallons per minute per square foot of flow cross section.

The copper adsorption efficiency in the first tower was 72%, that is to say, the copper in solution decreased from 25 ppm to 7 ppm. The effluent from the first tower (10) was then passed through line 12 to series-connected tower 11 and thence through line 13 via pump 14, the copper remaining in solution following the second adsorption step being less than 1 ppm. The combined adsorption efficiency of the two towers (from 25 ppm to 1 ppm) was 96%.

As stated hereinabove, one of the advantages of the foregoing system is that the adsorbed copper can be removed easily from the tower by employing a series of stripping steps using a copper-selective solvent. One embodiment comprises using mild solutions of 2% sulfuric acid and 25% ammonium hydroxide independently and in sequence with intermittent water washes, a typical sequence of steps being acid-water-ammonia-water-acid-water and ammonia. In one test, the equivalent of 57.2 gallons of eluate per cubic foot of carbon resulted in 92% accountability balance of copper adsorbed versus the copper stripped.

Another advantage of the foregoing system is that the carbon can be regenerated by an acid treatment, for example, by passing a sulfuric acid solution of pH of about 1.5 to 2.0 through the towers until the effluent indicates a pH of about 2. This conditions the carbon bed to a pH of about 2.0 which renders it ready for another cycle of feed solution of pH of about 6.5.

As illustrative of the various aspects of the invention, the following detailed example is given:

EXAMPLE 1

Two tests were conducted using the series-connected columns shown schematically in the drawing. The details concerning the size of the columns, the amount of carbon employed and the analyses of the starting solutions are given in Tables 1 and 2 below.

Similar results were obtained in Table 2. Following the first adsorption step, the copper content of the solution dropped from 28 ppm to 8 ppm and that following adsorption in the second column, the copper content went from 8 ppm to less than 1 ppm, thus providing an overall adsorption efficiency of about 96%.

Tests conducted on the stripping of copper from the activated carbon are given in Example 2 below.

Table 1

Summary of a Two-Column Adsorption Test Using As-Received Pittsburgh Activated Carbon

| Column Height | 75 in. | Weight of Carbon-Each Column 520 g. |
|---|---|---|
| Column Diameter | (I.D.): 0.98 inch | Volume of Carbon-Each Column 700 cc. |
| Carbon Bed Depth: | 60 inch | Flow Rates: 29 ml/min. (1.5 GPM/Sq.Ft.) |

Feed Composition:
Column No. 1: Ni-60.0 gpl; Co - 0.54 gpl; Cu - 25 ppm; pH - 6.5
Column No. 2: Ni-60.0 gpl; Co - 0.54 gpl; Cu - 7 ppm; pH - 6.5

CYCLE I

| Sample No. | Liters Processed | Effluent Cu Conc. ppm | Cumulative Cu Avail. in feed-g | Cumulative Cu Adsorb. g. | Cumulative Gallons Processed | Throughput Vol. Gallons/cu.ft. of carbon |
|---|---|---|---|---|---|---|
| Column No.1 | | | | | | |
| 1 | 2 | 7 | 0.050 | 0.036 | 0.53 | 21.2 |
| 2 | 5 | 7 | 0.125 | 0.090 | 1.32 | 52.8 |
| Column No.2* | | | | | | |
| 1 | 2 | < 1.0 | 0.014 | 0.012 | 0.53 | 21.2 |
| 2 | 5 | < 1.0 | 0.035 | 0.030 | 1.32 | 52.8 |

Total Cu Adsorbed: 0.120 g
Adsorption Efficiency: 96%
*Feed to Column No. 2 was the effluent from Column No. 1.

Table 2

SUMMARY OF A TWO-COLUMN ADSORPTION TEST USING AS-RECEIVED PITTSBURGH ACTIVATED CARBON - SECOND CYCLE

| Column Height: | 75 in. | Weight of Carbon-Each Column: 520 g. |
|---|---|---|
| Column Diameter (I.D.): | 0.98 inc. | Volume of Carbon-Each Column: 700 cc |
| Carbon Bed Depth: | 60 in. | Flow Rates: 29 ml/min (1.5GPM/sq.ft |

Feed Composition:
Column No. 1: Ni-60.0 gpl; Co-0.54 gpl; Cu-28 ppm; pH-6.5
Column No. 2: Ni-60.0 gpl; Co-0.54 gpl; Cu-8.0; pH-6.5

Cycle II

| Sample No. | Liters Processed | Effluent Cu Conc. ppm | Cumulative Cu Avail. in feed-g | Cumulative Cu Adsorb. g | Cumulative Gallons Processed | Throughput Vol. Gallons/cu.ft of Carbon |
|---|---|---|---|---|---|---|
| Column No.1 | | | | | | |
| 1 | 2 | 8 | 0.056 | 0.040 | 0.53 | 21.2 |
| 2 | 5 | 8 | 0.140 | 0.100 | 1.32 | 52.8 |
| Column No.2* | | | | | | |
| 1 | 2 | < 1.0 | 0.016 | 0.014 | 0.53 | 21.2 |
| 2 | 5 | < 1.0 | 0.040 | 0.035 | 1.32 | 52.8 |

Total Cu Adsorbed: 0.135 g.
Adsorption Efficiency: 96%
*Feed to Column No. 2 was the effluent from Column No. 1.

It will be noted from Table 1, that following the adsorption treatment in the first column, the copper content of the solution dropped from 25 ppm to 7 ppm and that following further treatment in the second column, the copper content in the solution fell from 7 ppm to less than 1 ppm, with an overall efficiency of 96%.

EXAMPLE 2

Each of the towers was eluted using a series of sequential steps comprising acid-water-ammonia which are repeated. The details and results concerning this process are given in Table 3 as follows:

Table 3

SUMMARY OF A TWO-COLUMN ELUTION TEST USING AS-RECEIVED PITTSBURGH ACTIVATED CARBON

| Column Heights: 75 in. | Weight of Carbon-Each Column:520 g. |
|---|---|
| Column Diameters (I.D.): 0.98 in. | Volume of Carbon-Each Column:700 cc. |
| Carbon Bed Depths: 60 in. | Void Bed Volume: 300 cc. |
| Elution Reagents: 2% $H_2SO_4$ and 25% $NH_4OH$ | Flow Rates:10 ml/min(0.5 GPM/Sq.Ft.) |

Cycle I

Eluate Volume — Total Cumulative Gal-

Table 3-continued

SUMMARY OF A TWO-COLUMN ELUTION TEST USING
AS-RECEIVED PITTSBURGH ACTIVATED
CARBON

| | Sample No. | Eluting Reagent | No. of Void Bed Volumes | Eluate Conc. PPM | | | Cumulative Cu Stripped g. | Cumulative Gallons | Ions Eluate Per Cu.Ft./Carbon |
|---|---|---|---|---|---|---|---|---|---|
| | | | | Ni | Co | Cu | | | |
| Col. No.1 | 1 | $H_2SO_4$ | 3.33 | 460 | 4 | 66.0 | 0.066 | 0.26 | 10.4 |
| | 2 | $H_2O$ | 1.67 | 20 | <1 | 2.5 | 0.067 | 0.39 | 40.4 |
| | 3 | $NH_4OH$ | 3.33 | 4 | <1 | 0.1 | 0.067 | 0.65 | 26.0 |
| | 4 | $H_2O$ | 1.67 | 3 | <1 | 10.0 | 0.072 | 0.78 | 31.2 |
| | 5 | $H_2SO_4$ | 3.33 | 1 | <1 | 8.0 | 0.080 | 1.04 | 41.6 |
| | 6 | $H_2O$ | 1.67 | .7 | <1 | 0.6 | 0.081 | 1.17 | 46.8 |
| | 7 | $NH_4OH$ | 3.33 | .1 | <1 | 0.1 | 0.081 | 1.43 | 57.2 |
| Col. No.2 | 1 | $H_2SO_4$ | 3.33 | 260 | 3 | 21.0 | 0.021 | 0.26 | 10.4 |
| | 2 | $H_2O$ | 1.67 | 2 | <1 | 3.0 | 0.022 | 0.39 | 40.4 |
| | 3 | $NH_4OH$ | 3.33 | 6 | <1 | 1.0 | 0.024 | 0.65 | 26.0 |
| | 4 | $H_2O$ | 1.67 | 1 | <1 | 1.0 | 0.024 | 0.78 | 31.2 |
| | 5 | $H_2SO_4$ | 3.33 | 4 | <1 | 3.0 | 0.027 | 1.04 | 41.6 |
| | 6 | $H_2O$ | 1.67 | 4 | <1 | 2.0 | 0.028 | 1.17 | 46.8 |
| | 7 | $NH_4OH$ | 3.33 | 1 | <1 | 1.0 | 0.029 | 1.43 | 57.2 |

Total Cu stripped: 0.110 g.
Recovery Balance: 92.7%

As will be noted from the foregoing table, a total of 0.081 gram of copper was stripped from the first column and 0.029 gram from the second column, giving an overall recovery of 0.110 gram of copper which calculates to a recovery balance of about 92.7%.

Additional tests have confirmed that the residual copper level in a solution can be reduced to 1 ppm or below. While adsorption efficiencies as high as 96% have been realized, it should be appreciated that the amount of adsorption efficiency will vary according to the actual amount of residual copper in the starting solution. For example, while the starting solution contains 25 ppm of copper which is reduced to about 1 ppm, the efficiency would be about 96%. However, where the starting solution to be treated contains only 3 ppm of copper which is reduced to 1 ppm, the adsorption efficiency would be 66%, even through the final copper content in both solutions is the same, that is, 1 ppm or below.

Broadly speaking, the adsorption efficiency may range from about 60 to 98% where the final residual copper content is reduced to below 3 ppm. The foregoing applies to acid solutions containing residual copper in amounts ranging from about 3 to 250 ppm, preferably 10 to 75 and, more preferably, 15 to 30 ppm.

As stated hereinbefore, the invention is preferably applicable to nickel sulfate leach solutions containing 15 to 100 gpl of nickel, up to 5 gpl of cobalt and residual copper in the amounts stated hereinabove. The pH of such solutions will generally range from about 5 to 6.8 and usually from about 5.5 to 6.5.

The solutions for eluting or stripping the adsorbed copper from the activated carbon are generally those solutions in which the copper is easily soluble, such as $H_2SO_4$ and $NH_4OH$. Either solution may be used separately or may be used sequentially separated by a water wash. The concentration of the sulfuric acid solution is preferably dilute and may range from 1 to 5%, while the concentration of the ammonium hydroxide solution may range from about 10 to 40%. Solution concentrations found particularly useful are 2% $H_2SO_4$ and 25% $NH_4OH$.

A sequential arrangement of stripping steps is preferred, to wit: acid-water-ammonia-water-acid-ammonia-water, etc., over the aforementioned concentrations.

In regenerating the activated carbon following stripping of the copper, sulfuric acid may be used having a pH ranging from about 1 to 3 and, preferably, from about 1.5 to 2.

As illustrative of a leaching system utilizing the process of the invention, reference is made to FIG. 2 as follows:

A. The matte at (1) contains about 50.5% Ni, 28.1% Cu, 0.6% Co, 2.0% Fe and 18.8% S, the amount of sulfur being less than the stoichiometric amount to combine with all of the metal values.

B. The matte is then subjected to atmospheric leach (2) at about 160° to 180°F in a strongly aerated solution using a spent electrolyte solution containing 55 gpl Ni (grams per liter), 20 gpl Cu, 0.85 gpl Co, 122 gpl $SO_4$ and 43 gpl $H_2SO_4$ to provide a leach liquor containing 60 gpl Ni, 1 gpl Co, 140 gpl $SO_4$, 5 gpl $H_2SO_4$ and about 30 ppm Cu.

C. The nickel solution with the residual copper is removed at (3) and the undissolved matte residue containing copper and nickel retained at (3A) for high pressure leach at (4A). The residue which is washed contains 28% Ni, 46% Cu, 0.8% Co, 2.4% Fe and 22% S.

D. The nickel sulfate solution (3) is passed to (4) for treatment in adsorption columns 10 and 11 of FIG. 1 in accordance with the method described for Example 1 and the copper removed to less than 1 ppm, the nickel solution being thereafter sent to nickel recovery.

E. The copper is acid stripped from the columns at (5) using 2% sulfuric acid solution and the acid copper-stripping solution then fed to the high pressure leaching step at (4A) as make-up solution.

F. The stripped carbon is regenerated at (6) by passing sulfuric acid of pH 1.5 to 2 through the carbon-packed columns and the regenerated carbon reused as in step (4).

G. The washed residue from (3A) is high pressure leached with sulfuric acid at a pH below 1 at 600 to 700 psig pressure and a temperature of about 350° to 400°F under oxidizing conditions, the copper-stripping solution being used to provide make-up solution. The copper and nickel sulfides are oxidized to sulfates and simultaneously dissolved by the leach solution. The resulting solution is then sent to copper recovery by electro-winning, the spent electrolyte being then recycled as make-up leach liquor to atmospheric leach at (2) for use with fresh nickel-copper matte.

As will be apparent, the removal of residual copper from the nickel sulfate leach solution following atmospheric leach serves as an important adjunct to the overall leaching process in that it enables the production of a nickel product low in or substantially devoid of copper.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method for removing residual copper from an acid nickel sulfate leaching solution of pH of about 5 to 6.8 containing about 15 to 100 gpl nickel sulfate, up to about 5 gpl cobalt and containing about 3 to 250 ppm of copper which comprises, providing a column of activated particulate carbon series-connected to at least one other column containing said carbon, and then passing said solution through said series-connected columns of activated carbon to remove substantially said copper from said solution to below 3 ppm by adsorption in said columns at an adsorption efficiency of about 60 to 98%.

2. The method of claim 1, wherein the pH ranges from about 5 to 6.5 and wherein the amount of residual copper in said acid nickel sulfate solution to be treated ranges from about 10 to 75 ppm.

3. The method of claim 2, wherein the amount of residual copper in said acid nickel sulfate solution ranges from about 15 to 30 ppm.

4. The method of claim 1, wherein following the adsorption of copper by said activated carbon, the copper is stripped from said carbon by passing a copper-selective solvent through the columns of said carbon selected from the group consisting of a sulfuric acid solution of about 1 to 5% concentration of an ammonium hydroxide solution of 10 to 40% concentration.

5. The method of claim 4, wherein the copper solvent comprises the sequential use in series of sulfuric acid-water-ammonia-water, with the sequential steps repeated until substantially all of the adsorbed copper is removed from the carbon.

* * * * *

UNITED STATES PATENT OFFICE
CERTIFICATE OF CORRECTION

Patent No. 3,914,374      Dated October 21, 1975

Inventor(s) Harold Koehler, Weldon P. Zundel and Robert S. Rickard

It is certified that error appears in the above-identified patent and that said Letters Patent are hereby corrected as shown below:

Column 8, claim 4, line 19, "of" (second occurrence) should be --or--.

Signed and Sealed this ninth Day of March 1976

[SEAL]

Attest:

RUTH C. MASON
*Attesting Officer*

C. MARSHALL DANN
*Commissioner of Patents and Trademarks*